United States Patent
Wang et al.

(10) Patent No.: US 11,893,291 B2
(45) Date of Patent: Feb. 6, 2024

(54) PRINT JOB CANCELLATION METHOD, TERMINAL DEVICE, AND COMPUTER-READABLE STORAGE MEDIUM

(71) Applicant: Zhuhai Pantum Electronics Co., Ltd., Zhuhai (CN)

(72) Inventors: Aosong Wang, Zhuhai (CN); Yunying Shang, Guangzhou (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/857,873

(22) Filed: Jul. 5, 2022

(65) Prior Publication Data
US 2023/0100496 A1    Mar. 30, 2023

(30) Foreign Application Priority Data
Sep. 28, 2021    (CN) .......................... 202111141651.9

(51) Int. Cl.
G06F 3/12    (2006.01)

(52) U.S. Cl.
CPC ............ *G06F 3/1234* (2013.01); *G06F 3/121* (2013.01); *G06F 3/1203* (2013.01)

(58) Field of Classification Search
CPC .................................................... G06F 3/1234
USPC ........................................................ 358/1.14
See application file for complete search history.

(56) References Cited

U.S. PATENT DOCUMENTS

| | | | | |
|---|---|---|---|---|
| 2002/0021453 | A1* | 2/2002 | Sakamoto | G06F 3/126 358/1.14 |
| 2004/0227972 | A1* | 11/2004 | Uchikawa | G06F 3/1207 358/1.14 |
| 2006/0132824 | A1* | 6/2006 | Aritomi | G06F 21/608 358/1.14 |
| 2007/0008579 | A1 | 1/2007 | Kawasaki | |
| 2010/0195147 | A1 | 8/2010 | Tamura | |

FOREIGN PATENT DOCUMENTS

| | | |
|---|---|---|
| CN | 102223392 A | 10/2011 |
| CN | 103116479 A | 5/2013 |
| CN | 112988089 A | 6/2021 |
| JP | 2010167710 A | 8/2010 |

* cited by examiner

*Primary Examiner* — Jamares Q Washington
(74) *Attorney, Agent, or Firm* — ANOVA LAW GROUP, PLLC (57) ABSTRACT

Embodiments of the present disclosure provide a print job cancellation method, a terminal device, and a computer-readable storage medium. The method includes determining whether a print job is canceled; if the print job is determined to be canceled, adding specific data to print job content of the print job to generate print data, where the specific data is configured to instruct an end of analyzing the print data and/or instruct an end of the print job; and transmitting the print data to an image forming apparatus, such that the image forming apparatus ends the print job according to the specific data analyzed from the print data.

19 Claims, 5 Drawing Sheets

PRINT JOB CANCELLATION METHOD, TERMINAL DEVICE, AND COMPUTER-READABLE STORAGE MEDIUM

CROSS-REFERENCE TO RELATED APPLICATION

This application claims the priority to Chinese patent application No. 202111141651.9, filed on Sep. 28, 2021, in the China National Intellectual Property Administration, the entirety of which is incorporated herein by its reference.

TECHNICAL FIELD

The present disclosure generally relates to the field of printer technology and, more particularly, relates to a print job cancellation method, a terminal device, and a computer-readable storage medium.

BACKGROUND

In the case where a user's terminal device is connected to an image forming apparatus, the user may execute a print job by transmitting print job content to the image forming apparatus. When the user finds that the print job content transmitted to the image forming apparatus is not the print job content expected to be printed, the user may instruct the image forming apparatus to stop printing through a print cancellation manner.

In the existing technology, when the user wants to cancel the print job content that is not expected to be printed, three following possible manners may be used. The user may perform a job cancellation operation through relevant keys on the operation panel of the image forming apparatus; or the user may also perform a job cancellation operation through the application software on the user's terminal device; or the user may also perform a job cancellation operation in the print spooler on the Windows side of the terminal device. Printing may be cancelled by the cancellation manner through relevant keys on the operation panel of the image forming apparatus or the cancellation manner through the application software on the user's terminal device, which may both cancel the print job directly without affect normal printing operations of subsequent print jobs.

However, when the user chooses to cancel printing by canceling the print job in the print spooler on the Windows side of the terminal device, since the terminal device transmits the print job content to the image forming apparatus in real time for the image forming apparatus to print out the print job content, the print job content currently being processed may be directly truncated, which may result in incomplete print job content transmitted to the image forming apparatus. Therefore, after the image forming apparatus receives incomplete print job content and when the user's terminal device issues print job content again, the image forming apparatus may print abnormally due to incomplete content of previous print job, which may affect subsequent print jobs.

SUMMARY

One aspect of the present disclosure provides a print job cancellation method. The method includes determining whether a print job is canceled; if the print job is determined to be canceled, adding specific data to print job content of the print job to generate print data, where the specific data is configured to instruct an end of analyzing the print data and/or instruct an end of the print job; and transmitting the print data to an image forming apparatus, such that the image forming apparatus ends the print job according to the specific data analyzed from the print data.

Another aspect of the present disclosure provides a terminal device. The terminal device includes an application software module, a print data processing module, a print control module, and a background print processing module. The application software module is configured to transmit original print job content of a print job to the print data processing module; the print data processing module is configured to perform language conversion on the original print job content to generate print job content recognizable by an image forming apparatus and transmit the print job content to the background print processing module; the background print processing module is configured to determine whether the print job is canceled, and if the print job is determined to be canceled, transmit the print job content before the print job is cancelled to the print control module; and the print control module is configured to add specific data in the print job content before the print job is cancelled to generate print data and transmit the print data to the image forming apparatus, where the image forming apparatus ends the print job according to the specific data analyzed from the print data; and the specific data is configured to instruct an end of analyzing the print data and/or instruct an end of the print job.

Another aspect of the present disclosure provides a terminal device. The terminal device includes one or more processors, a memory, and one or more computer programs. The one or more computer programs are stored in the memory, the one or more computer programs include instructions, when being executed by the terminal device, the instructions cause the terminal device to execute a print job cancellation method, comprising: determining whether a print job is canceled; if the print job is determined to be canceled, adding specific data to print job content of the print job to generate print data, where the specific data is configured to instruct an end of analyzing the print data and/or instruct an end of the print job; and transmitting the print data to an image forming apparatus, such that the image forming apparatus ends the print job according to the specific data analyzed from the print data.

Another aspect of the present disclosure provides a non-transitory computer-readable storage medium, where the computer-readable storage medium stores a program; and when being executed, the program causes a device where the computer-readable storage medium is located to execute above-mentioned print job cancellation method.

Another aspect of the present disclosure provides a computer program product including an instruction, where when being executed on a computer or any at least one processor, the computer program product causes the computer to execute above-mentioned print job cancellation method.

Other aspects of the present disclosure can be understood by those skilled in the art in light of the description, the claims, and the drawings of the present disclosure.

BRIEF DESCRIPTION OF THE DRAWINGS

To clearly describe technical solutions of various embodiments of the present disclosure, the drawings need to be used for describing various embodiments are described below. Obviously, the drawings in the following description are merely some embodiments of the present disclosure. For those skilled in the art, other drawings may be obtained in accordance with these drawings without creative efforts.

DETAILED DESCRIPTION

To better understand technical solutions of the present disclosure, embodiments of the present disclosure are described in detail with reference to accompanying drawings.

It should be noted that described embodiments are only a part of embodiments of the present disclosure, rather than all embodiments. Based on embodiments in the present disclosure, all other embodiments obtained by those skilled in the art without creative work shall fall within the protection scope of the present disclosure.

The terms used in embodiments of the present disclosure are only for the purpose of describing specific embodiments and are not intended to limit the present disclosure. The singular forms of "a", "the" and "said" used in embodiments of the present disclosure and the appended claims are also intended to include plural forms, unless the context clearly indicates other meanings.

It can be understood that the term "and/or" used in the specification may only be an association relationship describing associated objects, which means that there may be three types of relationships. For example, A and/or B can mean that: A alone exists, A and B exist at the same time, and B exists alone. In addition, the character "/" in the specification normally indicates that associated objects before and after are in an "or" relationship.

Figure 1:
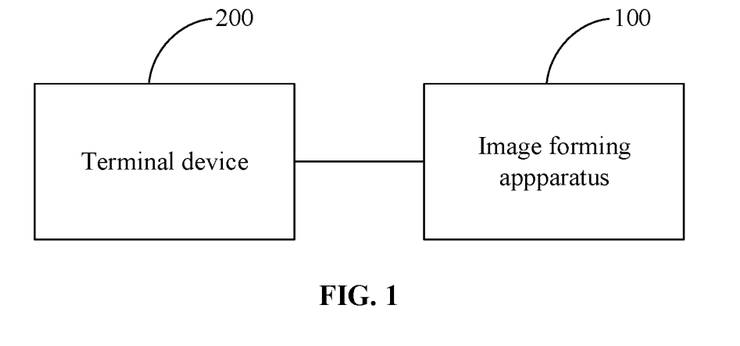
FIG. 1 illustrates a structural schematic of a print system provided by exemplary embodiments of the present disclosure.

FIG. 1 illustrates a structural schematic of a print system provided by exemplary embodiments of the present disclosure. As shown in FIG. 1, the system may include an image forming apparatus 100 and a terminal device 200.

The image forming apparatus 100 may be a device with a printing function, such as a printer or a multifunction machine, where the multifunction machine may be a device that integrates functions such as printing, copying, scanning, and faxing. The terminal device 200 may be a desktop computer, a portable computer, or the like.

The image forming apparatus 100 and the terminal device 200 may be communicatively connected through a universal serial bus (USB) or a wireless fidelity (Wi-Fi) network. The terminal device 200 may be installed with a print driver adapted to the image forming apparatus 100, such that the application software installed in the terminal device 200 may drive the image forming apparatus 100 to execute the print job. When the user uses the application software in the terminal device 200 for printing, the printing driver may be called through the application software to configure a print manner, and the image forming apparatus 200 may be driven for printing according to the configured print manner through the print driver.

Figure 2:
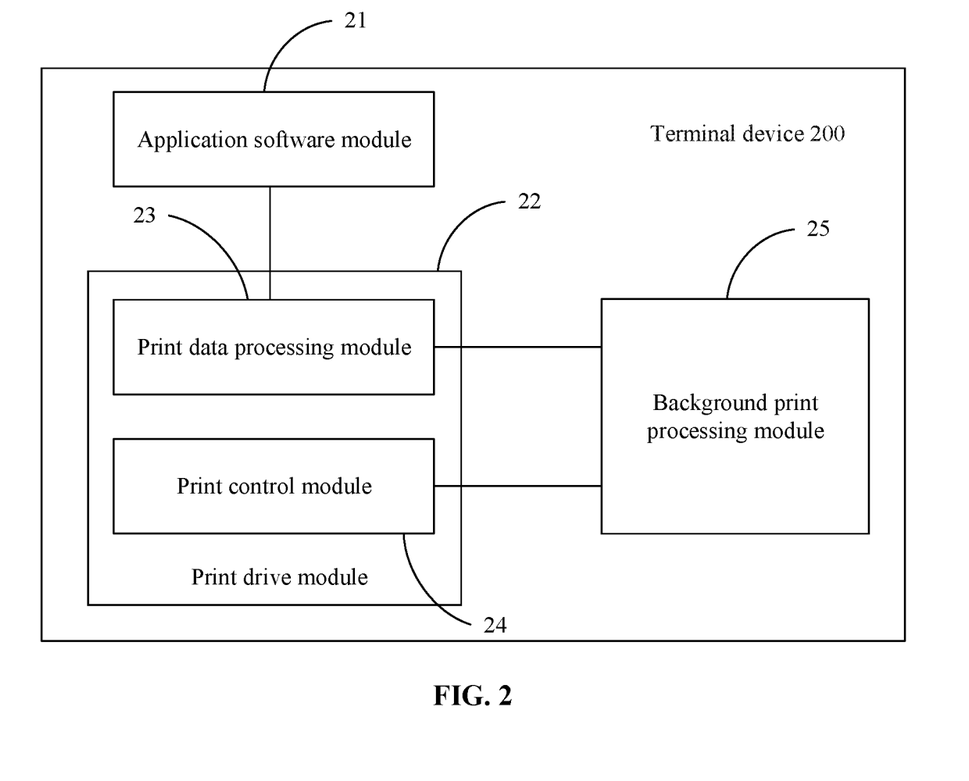
FIG. 2 illustrates a structural schematic of a terminal device provided by exemplary embodiments of the present disclosure.

FIG. 2 illustrates a structural schematic of a terminal device provided by exemplary embodiments of the present disclosure. As shown in FIG. 2, the terminal device 200 may include an application software module 21, a print drive module 22, and a background print processing module 25, where the print drive module 22 may include a print data processing module 23 and a print control module 24.

It should be noted that the Windows side of the terminal device 200 may be provided with a print spooler which may be understood as a logical printer used to manage the print job content. In embodiments of the present disclosure, as shown in FIG. 2, the print spooler may be the background print processing module 25.

It should be noted that the terminal device 200 may be provided with a language monitor. In embodiments of the present disclosure, as shown in FIG. 2, the language monitor may be the print control module 24.

The application software module 21 may be configured to receive and edit the original print job content and transmit the original print job content to the print data processing module 23. The print data processing module 23 may be configured to perform language conversion on the original print job content to generate print job content recognizable by the image forming apparatus and transmit the print job content to the background print processing module 25. The background print processing module 25 may be configured to transmit the print job content to the print control module 24 in the form of a data stream. The print control module 24 may be configured to transmit the print job content in the form of a data stream to the image forming apparatus 100. The image forming apparatus 100 may execute the print job based on the print job content in the form of a data stream.

Figure 3:
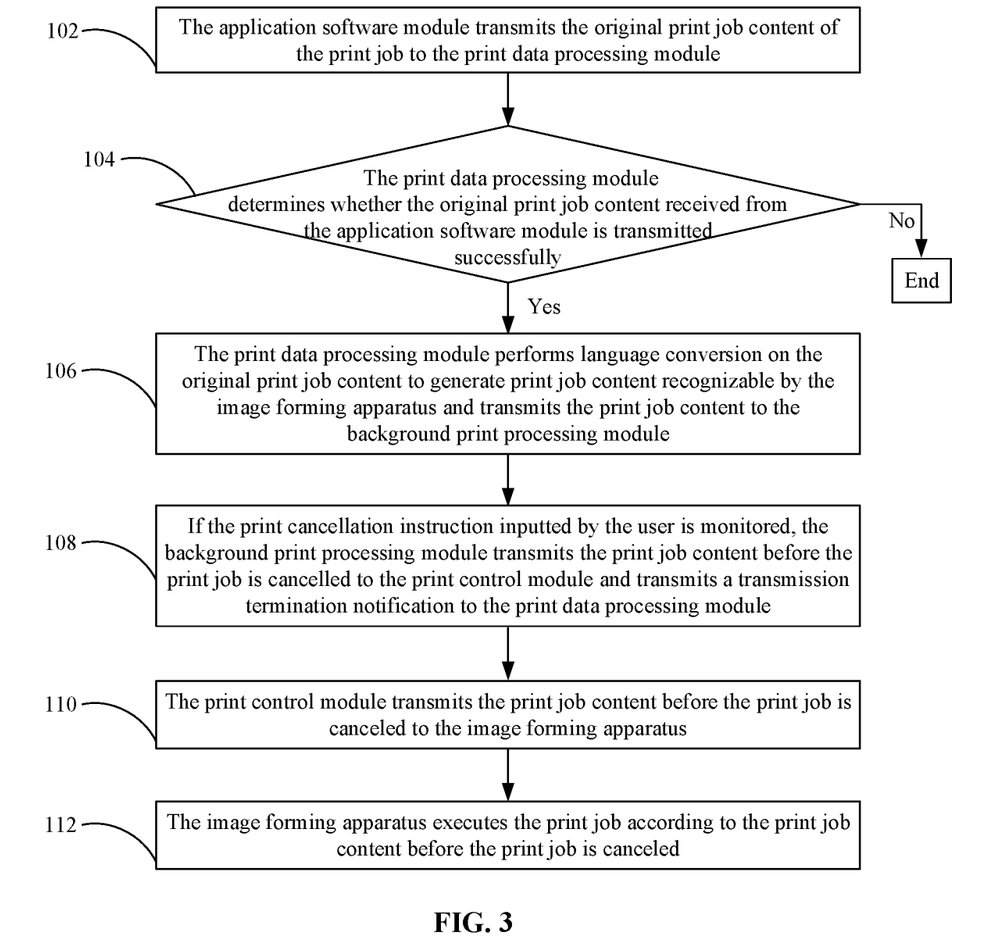
FIG. 3 illustrates a flow chart of a print job cancellation method.

Based on the terminal device 200 shown in FIG. 2, a print job cancellation method is provided in the existing technology. FIG. 3 illustrates a flow chart of a print job cancellation method. As shown in FIG. 3, the method may include following exemplary steps.

At step 102, the application software module 21 may transmit the original print job content of the print job to the print data processing module 23.

The user may edit, and store acquired original print job through the application software module 21 and transmit edited original print job content to the print data processing module 23.

At step 104, the print data processing module 23 may determine whether the original print job content received from the application software module 21 is transmitted successfully. If it is successful, step 106 may be executed; if it is not successful, the process may be ended.

At step 106, the print data processing module 23 may perform language conversion on the original print job content to generate print job content recognizable by the image forming apparatus and transmit the print job content to the background print processing module 25.

At step 108, if the print cancellation instruction inputted by the user is monitored, the background print processing module 25 may transmit the print job content before the print job is cancelled to the print control module 24 and transmit a transmission termination notification to the print data processing module 23.

When the user chooses to cancel the print job task in the background print processing module 25, the background print processing module 25 may monitor the print cancellation instruction inputted by the user. Then, the background print processing module 25 may transmit the transmission termination notification to the print data processing module 23 to notify the print data processing module 23 to terminate the transmission of the print job content transmitted by the application software module 21, such that continuous transmission of the print job content from the application software module 21 may be prevented. The background print processing module 25 may only transmit received print job content before the print job is canceled to the print control module 24.

At step 110, the print control module 24 may transmit the print job content before the print job is canceled to the image forming apparatus 100.

At Step 112, the image forming apparatus 100 may execute the print job according to the print job content before the print job is canceled.

In the existing technology, canceling the print job does not mean that all print jobs are canceled. For example, the user may issue a print job through the application software module 21 on the terminal device 200, and the print control module 24 may transmit the print job content including 10 pages of print content to the image forming apparatus 100. According to the time interval between the time when the user inputs the print cancellation instruction and the transmission time, the image forming apparatus 100 may print out 0 to 10 pages of print job content. That is, if the user cancels the print job quickly, the image forming apparatus 100 may not print out even one page; and if the user cancels the print job slowly, the image forming apparatus 100 may print out a part or all of the print job content. The print control module 24 transmits the print job content to the image forming apparatus 100 in real time for the image forming apparatus 100 to execute the print job according to the print job content. Therefore, when the user cancels the print job in the background print processing module 25, the print job content may not be completely transmitted, but only a part of the content may be transmitted. In such scenario, the image forming apparatus 100 may be abnormal due to incomplete received print job content, thereby affecting normal execution of subsequent print jobs.

Figure 4:
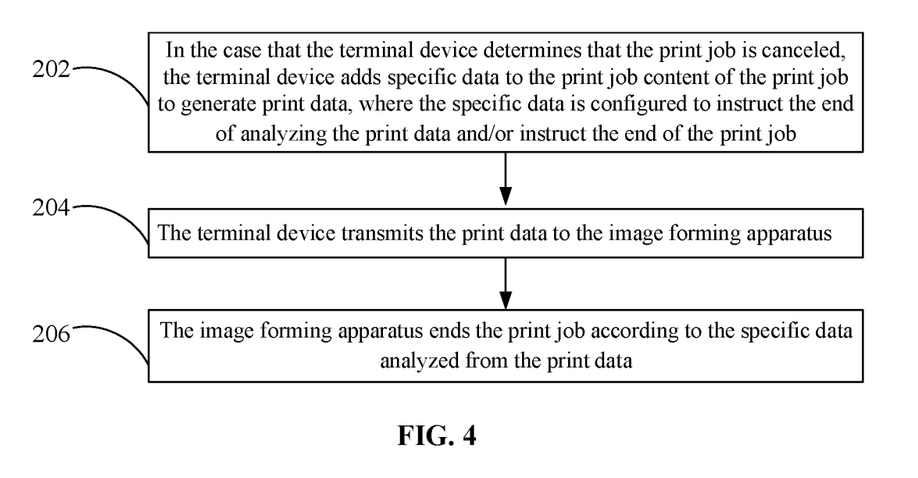
FIG. 4 illustrates a flow chart of a print job cancellation method provided by exemplary embodiments of the present disclosure.

To solve above-mentioned technical problem, embodiments of the present disclosure provide a print job cancellation method. FIG. 4 illustrates a flow chart of a print job cancellation method provided by exemplary embodiments of the present disclosure. As shown in FIG. 4, the method may include following exemplary steps.

At step 202, in the case that the terminal device determines that the print job is canceled, the terminal device may add specific data to the print job content of the print job to generate print data, where the specific data may be configured to instruct the end of analyzing the print data and/or instruct the end of the print job.

In embodiments of the present disclosure, the terminal device may monitor whether a print cancellation instruction inputted by the user in the print spooler is received. If the print cancellation instruction inputted by the user is monitored, it determines that the print job may be canceled.

In embodiments of the present disclosure, as shown in FIG. 2, the background print processing module 25 of the terminal device 200 may determine the status information in the print queue information (JOB_INFO_1) structure by accessing the "EndDocPort" function and monitor whether the print cancellation instruction inputted by the user is received, thereby determining whether the print job is canceled.

In embodiments of the present disclosure, if the terminal device monitors the print cancellation instruction inputted by the user, the terminal device may add specific data to the print job content. Optionally, the terminal device may add specific data at the end of the print job content. The specific data may be configured to indicate the end of analyzing the print data; or the specific data may be configured to indicate the end of the print job; or the specific data may be configured to instruct the end of analyzing the print data and the end of the print job.

In embodiments of the present disclosure, the specific data may include dummy data and/or a print job end mark.

Optionally, when the specific data includes dummy data, the dummy data may be configured to indicate the end of analyzing the print data. When the dummy data is analyzed, the image forming apparatus exits the analyzing operation. For example, the dummy data may be 0x00.

Optionally, the specific data may include a print job end mark, where the print job end mark may be configured to indicate the end of the print job. When the print job end mark is analyzed, the image forming apparatus may complete reception of all print data of the print job and end the print job.

Optionally, the specific data may include dummy data and a print job end marker. As shown in FIG. 2, when receiving the print cancellation instruction inputted by the user, the background print processing module 25 may prevent the print data processing module 23 from continuing to transmit the print job content transmitted by the application software module 21 and transmit the print data before the print job is canceled to the image forming apparatus 100. The print control module 24 may add specific data to the print job content before the print job is canceled to generate print data and transmit the print data to the image forming apparatus 100. A copy of the print job content may include a pair of print job marks. A print job start mark may be configured at the beginning of each print job, and a print job end mark may be configured at the end of each print job. In embodiments of the present disclosure, the print job content may be truncated because the print job is canceled, such that in addition to adding dummy data to the print job content before the print job is canceled, the print control module 24 may also add the print end mark to the print job content before the print job is canceled, thereby exiting the analyzing operation of current print job and ending the print job. If dummy data is not added to the print job content to end the analyzing operation of current print job, the image forming apparatus 100 may not be able to identify the print job end mark, such that the analyzing operation of the print job may not exit to end printing. Therefore, in embodiments of the present disclosure, by adding specific data to the print job content to exit the analyzing operation, the image forming apparatus 100 may normally analyze the print job end mark, such that the analyzing operation of current print job may be closed normally to end current print job.

At step 204, the terminal device may transmit the print data to the image forming apparatus.

At step 206, the image forming apparatus may end the print job according to the specific data analyzed from the print data.

In embodiments of the present disclosure, the image forming apparatus 100 may scan and print out data blocks (bands) one by one in the process of performing the print job. In order to avoid the case that received dummy data has insufficient bytes to be discarded when the image forming apparatus 100 analyzes the print data of one data band, the byte length of the dummy data may be configured to be greater than the byte length of the data band scanned by the image forming apparatus 100 from the print data, which may ensure that the flow of analyzing one data band must end during the printing operation process of the image forming apparatus 100, so that subsequent operations may be performed normally.

Optionally, the image forming apparatus may analyze the dummy data from the print data and exit the analyzing operation of current data band in the print data according to the dummy data. That is, the dummy data may be added to the print job content, so that the image forming apparatus may exit analyzing operation flow of current data band and the print job may end normally.

Optionally, the image forming apparatus may analyze the print end mark from the print data and end the print job according to the print end mark. That is, the print end mark may be added to the print job content, so that the image forming apparatus may normally end the print job according to analyzed print job end mark.

Optionally, the image forming apparatus may analyzed the dummy data and the print end mark from the print data and exit the analyzing operation of current data band in the print data according to the dummy data. That is, the dummy data may be added to the print job content, so that the image forming apparatus may exit analyzing operation flow of current data band and end the print job according to the print end mark, thereby ending the print job normally.

In technical solutions provided by embodiments of the present disclosure, if it determines that the print job is cancelled, specific data may be added to the print job content of the print job to generate print data. The specific data may be configured to instruct the end of analyzing the print data and/or instruct the end of the print job, and the print data may be transmitted to the image forming apparatus, such that the image forming apparatus may end the print job according to the specific data analyzed from the print data. In embodiments of the present disclosure, the image forming apparatus may end the current print job in time by using the specific data added in the print job content, which may avoid the case that when print job content is transmitted to the image forming apparatus again, the image forming apparatus may print abnormally because previous print job content is incomplete, thereby avoiding the influence of incomplete content on subsequent print jobs due to print job cancellation.

Figure 5:
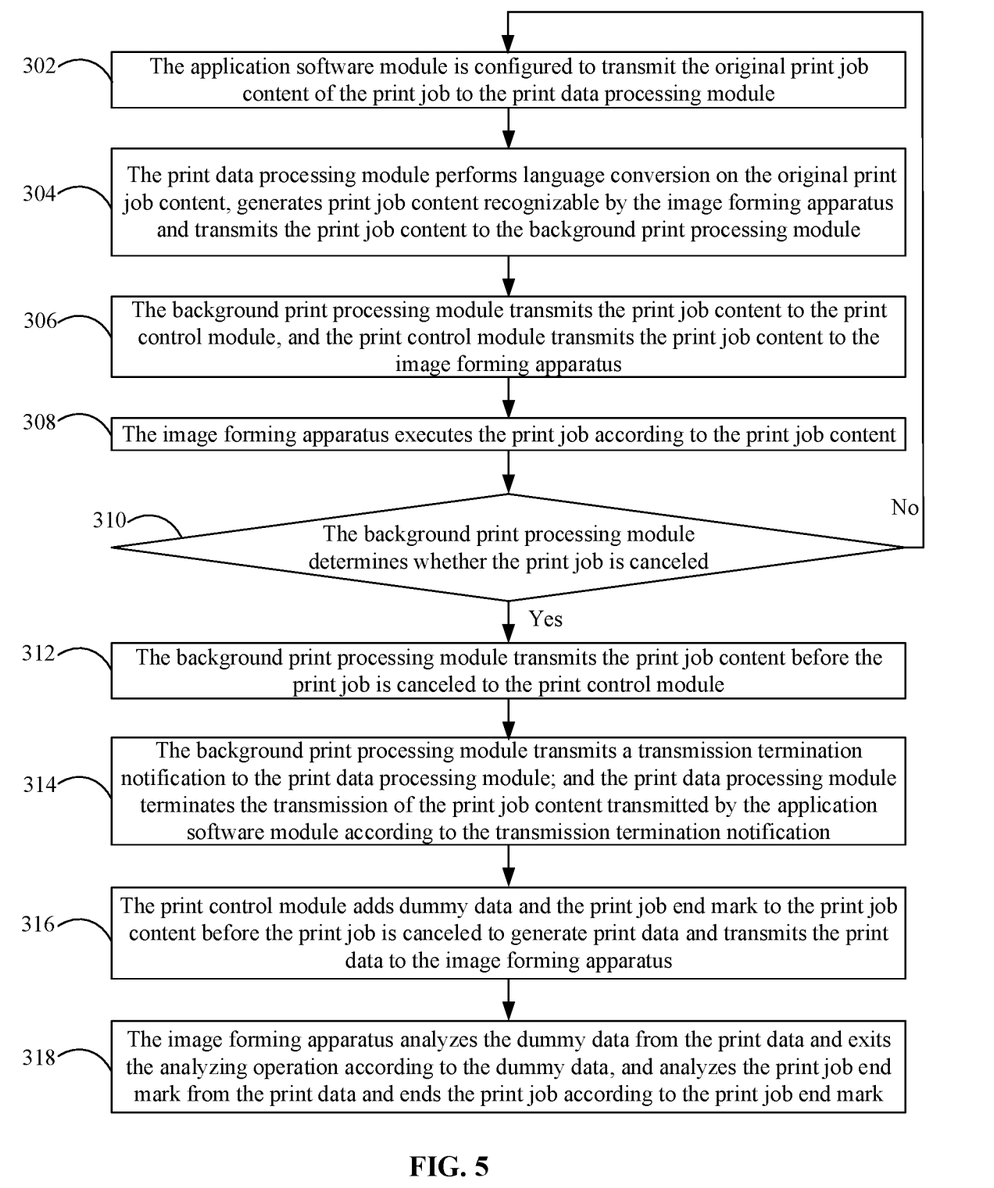
FIG. 5 illustrates a flow chart of another print job cancellation method provided by exemplary embodiments of the present disclosure.

Based on the terminal device 200 shown in FIG. 2, a print job cancellation method is provided. FIG. 5 illustrates a flow chart of another print job cancellation method provided by exemplary embodiments of the present disclosure. The method may include following exemplary steps.

At step 302, the application software module 21 may be configured to transmit original print job content of the print job to the print data processing module 23.

The user may edit, and store acquired original print job through the application software module 21 and transmit edited original print job content to the print data processing module 23.

At step 304, the print data processing module 23 may perform language conversion on original print job content, generate print job content recognizable by the image forming apparatus 100, and transmit the print job content to the background print processing module 25.

At step 306, the background print processing module 25 may transmit the print job content to the print control module 24, and the print control module 24 may transmit the print job content to the image forming apparatus 100.

The background print processing module 25 may transmit the print job content to the print control module 24 in the form of a data stream. The print control module 24 may transmit the print job content to the image forming apparatus 100 in the form of a data stream.

At step 308, the image forming apparatus 100 may execute the print job according to the print job content.

The image forming apparatus 100 may execute the print job based on the print job content in the form of a data stream.

At step 310, the background print processing module 25 may determine whether the print job is canceled. If it is cancelled, step 312 may be executed; if it is not cancelled, step 302 may be executed.

When the user needs to cancel the print job, the user may directly cancel the print job through relevant keys on the operation panel of the image forming apparatus 100 or cancel the job directly through the application software on the user's terminal device 200 or cancel the job through the background processing module 25 on the Windows side of the terminal device 200.

In the existing technology, when the user selects to cancel the print job through a related key (such as a "Cancel" key) on the operation panel of the image forming apparatus 100, the print job content at this point may be the print job content that has been completely transferred from the user's terminal device 200 to the image forming apparatus 100. That is, the image forming apparatus 100 may have received recognizable complete print job content. Therefore, when the user chooses to cancel printing, current print job may be interrupted directly, and normal operation of subsequent print jobs may not be affected. For example, the print job content issued by the user through the application software module 21 may include 10 pages of print content; after the image forming apparatus 100 prints out two pages of the print content, the user may find that the print job content is not what the user wants to print, the user may select to immediately interrupt current print job by pressing the "Cancel" button on the operation panel of the image forming apparatus 100. Then, the print job content may only print out 2 pages of the print content and remaining 8 pages of the print content may be interrupted and may not be printed out. At this point, if the user transmits the second copy of the print job content which is expected to be printed through the application software module 21, the image forming apparatus 100 may immediately print out the second copy of the print job content.

In another existing technology, the user may directly cancel the print job through the application software on the terminal device 200. That is, in the process of transmitting print job content from the application software module 21 to the print drive module 22 (at this point, the transmission has not been completed, and the interface displays relevant information "XX pages have been transmitted", where "XX pages" is less than 10 pages and used to represent the value of transmitted pages), the "Cancel" option in the application for opening the print job content may be clicked to cancel current print job. At this point, the print job content may only be transmitted from the application software module 21 to the print drive module 22, and the print job content may have not been transmitted to the image forming apparatus 100, such that when the job cancellation is selected, the transmission of the print job content may be directly cancelled without affecting normal printing operation of subsequent print jobs of the image forming apparatus 100.

In another existing technology, by canceling the print job in the background print processing module 25 of the Windows side of the terminal device 200, after the print data processing module 23 transmits the print job content to the background print processing module 25, the background print processing module 25 may normally transmit the print job content to the image forming apparatus 100 in real time, unless the image forming apparatus 100 is offline to be in a state to be printed. At this point, it may have time to cancel the print job. Otherwise, the user chooses to cancel the print job during the process of transmitting the print job content data from the print drive module 22 to the image forming apparatus 100, which may interrupt analyzing operation of the print job content data by the image forming apparatus 100, thereby interrupting the print job. In addition, different timing of canceling the job may affect how much the image forming apparatus 100 analyzes the print job content, such that timing of ending the print job may be affected, thereby affecting the end of the print job operation. For example, when the user transmits a print job content containing 10 pages of print content in the application software module 21 and when the user cancels the print job in the background print processing module 25, the image forming apparatus 100 may be analyzing the data of the first data band of the print job content at this point. Therefore, after monitoring the print cancellation instruction, the analyzing operation of current first data band may be interrupted, that is, the byte length of currently analyzed data may be less than the byte length of one data band. Therefore, the image forming apparatus 100 may not be able to exit the analyzing operation flow of current data band, and thus may not further normally analyze the print job end mark to end current print job, which may make the image forming apparatus 100 determine that current print job has not ended, and always wait to analyze the print job end mark. Therefore, even if subsequent print job content is issued, the image forming apparatus 100 may not normally execute the print job.

When the user issues the print cancellation instruction in the background print processing module 25, the background print processing module 25 may monitor the print cancellation instruction inputted by the user to determine that current print job is canceled, and steps 312 and 314 may be executed.

If the user does not input the print cancellation instruction, the background print processing module 25 may determine that the print job has not been canceled and execute step 302 to continue normal print job operation.

At step 312, the background print processing module 25 may transmit the print job content before the print job is canceled to the print control module 24.

The background print processing module 25 may transmit the print job content before the print job is canceled to the print control module 24 in the form of a data stream.

The background print processing module 25 may only transmit received print job content before the print job is canceled to the print control module 24. For received print job content after the print job is cancelled, the background print processing module 25 may not transmit received print job content after the print job is cancelled to the print control module 24. Therefore, previously received print job content after the print job is canceled may be prevented from being transmitted to the print control module 24.

At step 314, the background print processing module 25 may transmit the transmission termination notification to the print data processing module 23; and the print data processing module 23 may terminate the transmission of the print job content transmitted by the application software module 21 according to the transmission termination notification. Therefore, the print data processing module 23 may be prevented from continuing to transmit the print job content from the application software module 21.

It should be noted that in embodiments of the present disclosure, step 314 may be performed before step 312, or step 312 and step 314 may be performed simultaneously.

At step 316, the print control module 24 may add dummy data and the print job end mark to the print job content before the print job is canceled to generate print data and transmit the print data to the image forming apparatus 100.

The print control module 24 may transmit the print data in the form of a data stream to the image forming apparatus 100.

In the print data received by the print control module 24, there may be print data whose length is less than the byte length of one data band analyzed by the image forming apparatus 100. Therefore, the print control module 24 may add dummy data at the end of the print data, and the byte length of the dummy data may be greater than the byte length of one data band, so that the image forming apparatus 100 may exit the analyzing operation of current data band according to the analyzed dummy data. It should be further noted that the byte length of the dummy data here is greater than the byte length of the data band scanned by the image forming apparatus 100 from the print data, which may avoid the case that received dummy data is discarded due to insufficient bytes of dummy data when the image forming apparatus 100 analyzes the print data of one data band. For example, if the byte length of the dummy data "0x00" is greater than the byte length of one data band, the image forming apparatus 100 may inevitably end the analyzing process of one data band, so that subsequent operations may be performed normally. For example, subsequent operations may be operations of normally analyzing the print job end mark.

A copy of the print job content may include a pair of print job marks. A print job start mark may be configured at the beginning of each print job, and a print job end mark may be configured at the end of each print job. In embodiments of the present disclosure, the print job content may be truncated because the print job is canceled, such that in addition to adding dummy data to the print job content before the print job is canceled, the print control module 24 may add the print end mark to the print job content before the print job is canceled, thereby exiting the analyzing operation of current print job and ending the print job. If dummy data is not added to the print job content to end the analyzing operation of current print job, the image forming apparatus 100 may not be able to identify the print job end mark, such that the analyzing operation of the print job may not exit to end printing. Therefore, in embodiments of the present disclosure, by adding specific data to the print job content to exit the analyzing operation, the image forming apparatus 100 may normally analyze the print job end mark, such that the analyzing operation of current print job may be closed normally to end current print job.

At step 318, the image forming apparatus 100 may analyze the dummy data from the print data and exit the analyzing operation according to the dummy data; and analyze the print job end mark from the print data and end the print job according to the print job end mark.

In the technical solution provided by embodiments of the present disclosure, the image forming apparatus may exit the analyzing operation in time through the dummy data in the print data and end current print job in time according to the print job end mark in the print data; therefore, the influence on subsequent print jobs due to incomplete content of canceled print job may be avoided.

Embodiment of the present disclosure provides a computer-readable storage medium. The computer-readable storage medium may include a stored program, where when being executed, the program may cause the device where the computer-readable storage medium is located to execute above-mentioned print job cancellation method.

Embodiments of the present disclosure provide a computer program product including an instruction, where when the computer program product is executed on a computer or any at least one processor, the computer program product may cause the computer to execute above-mentioned print job cancellation method.

Embodiments of the present disclosure provide a terminal device, including one or more processors, a memory, and one or more computer programs. The one or more computer programs may be stored in the memory, the one or more computer programs may include instructions, when being executed by the device, the instructions may cause the device to execute above-mentioned print job cancellation method.

Embodiments of the present disclosure provide a terminal device. The terminal device may include one or more processors, a memory, and one or more computer programs. The one or more computer programs are stored in the memory, the one or more computer programs include instructions, when being executed by the terminal device, the instructions cause the terminal device to execute a print job cancellation method. The method may include determining whether a print job is canceled; if the print job is determined to be canceled, adding specific data to print job content of the print job to generate print data, where the specific data is configured to instruct an end of analyzing the print data and/or instruct an end of the print job; and transmitting the print data to an image forming apparatus, such that the image forming apparatus ends the print job according to the specific data analyzed from the print data.

Figure 6:
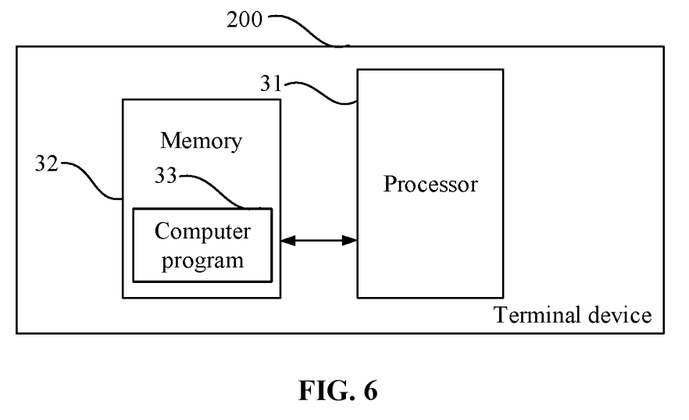
FIG. 6 illustrates a schematic of a terminal device provided by exemplary embodiments of the present disclosure.

FIG. 6 illustrates a schematic of a terminal device provided by exemplary embodiments of the present disclosure. As shown in FIG. 6, a terminal device 200 in one embodiment may include a processor 31, a memory 32, and a computer program 33 which is stored in the memory 32 and executable on the processor 31. When the computer program 33 is executed by the processor 31, the print job cancellation method in embodiments of the present disclosure may be implemented, which may not be described in detail herein.

The terminal device 200 may include, but may not be limited to, the processor 31 and the memory 32. Those skilled in the art should understand that FIG. 6 only illustrates an example of the terminal device 200, which may not limit the terminal device 200. The terminal device may include more or less components than the one shown in FIG. 6, or some components may be combined to form the terminal device, or different components may be used to form the terminal device. For example, network devices may also include input and output devices, network access devices, buses, and the like.

The processor 31 may be an element, including a central processing unit (CPU), other general-purpose processor, a digital signal processor (DSP), an application specific integrated circuit (ASIC), a field-programmable gate array (FPGA) or other programmable logic device, a discrete gate or transistor logic device, a discrete hardware component, and the like. A general-purpose processor may be a microprocessor, or the processor may be any conventional processor or the like.

The memory 32 may be an internal storage unit of the terminal device 200, such as a hard disk or a memory of the terminal device 200. The memory 22 may also be an external storage device of the terminal device 200, for example, a plug-in hard disk, a smart memory card (SMC), a secure digital (SD) card, a flash memory card, or the like equipped on the terminal device 200. Furthermore, the memory 32 may also include both an internal storage unit of the terminal device 200 and an external storage device. The memory 32 may be configured to store computer programs, and other programs and data required by the network device. The memory 32 may also be configured to temporarily store data that has been outputted or will be outputted.

From the above-mentioned embodiments, it may be seen that the solutions provided by the present disclosure may achieve at least the following beneficial effects.

In technical solutions provided by embodiments of the present disclosure, if it determines that the print job is cancelled, specific data may be added to the print job content of the print job to generate print data. The specific data may be configured to instruct the end of analyzing the print data and/or instruct the end of the print job, and the print data may be transmitted to the image forming apparatus, such that the image forming apparatus may end the print job according to the specific data analyzed from the print data. In embodiments of the present disclosure, the image forming apparatus may end the current print job in time by using the specific data added in the print job content, which may avoid the case that when print job content is transmitted to the image forming apparatus again, the image forming apparatus may print abnormally because previous print job content is incomplete, thereby avoiding the influence of incomplete content on subsequent print jobs due to print job cancellation.

Those skilled in the art may clearly understand that, for the convenience and brevity of description, for the working process of above-mentioned system, device and unit, reference may be made to corresponding process in above-mentioned method embodiments, which may not be described in detail herein.

In some embodiments provided by the present disclosure, it should be understood that the disclosed system, apparatus and method may be implemented in other manners. For example, the apparatus embodiments described above are merely exemplary. For example, the division of the unit may only be a logical function division. In actual implementation, there may be other division manners. For example, multiple units or components may be combined or integrated into another system, or some features may be omitted or may not be implemented. On the other hand, shown or discussed mutual coupling or direct coupling or communication connection may be through indirect coupling or communication connection of some interfaces, devices or units, and may be in electrical, mechanical or other forms.

The units described as separate components may or may not be physically separated, and components displayed as units may or may not be physical units, that is, may be located in one location, or may be distributed to multiple network units. Some or all of units may be selected according to actual needs to achieve the objective of the solution in one embodiment.

In addition, each functional unit in each embodiment of the present disclosure may be integrated into one processing unit, or each unit may exist physically alone, or two or more units may be integrated into one unit. Above-mentioned integrated units may be implemented in the form of hardware or may be implemented in the form of hardware plus software functional units.

Above-mentioned integrated units implemented in the form of software functional units may be stored in a computer-readable storage medium. Above-mentioned software functional units may be stored in a computer-readable storage medium which may include multiple instructions causing a computer device (which may be a personal computer, a server, a network device, or the like) or a processor to execute some steps of methods described in various embodiments of the present disclosure. Above-mentioned computer-readable storage medium may include U disk, mobile hard disk, read-only memory (ROM), random access memory (RAM), magnetic disk or optical disk, and other various programs that can store programs medium of code.

Above descriptions are only optional embodiments of the present disclosure and are not intended to limit the present disclosure. Any modification, equivalent replacement, improvement and the like made within the spirit and principle of the present disclosure shall be included within the protection scope of the present disclosure.

What is claimed is:

1. A print job cancellation method, comprising:
    determining whether a print job is canceled;
    in response to that the print job is determined to be canceled, adding specific data to print job content of the print job to generate print data, wherein the specific data is configured to instruct an end of the print job and includes a print job mark; and
    transmitting the print data to an image forming apparatus, such that after analyzing the print job end mark, the image forming apparatus completes reception of all print data of the print job and ends the print job according to the specific data analyzed from the print data.

2. The method according to claim 1, wherein the specific data includes dummy data, and when the dummy data is analyzed, the image forming apparatus exits an analyzing operation.

3. The method according to claim 2, wherein:
    a byte length of the dummy data is configured to be greater than a byte length of a data band scanned by the image forming apparatus from the print data.

4. The method according to claim 1, wherein determining whether the print job is canceled includes:
    in response to that a print cancellation instruction inputted by the user is monitored, determining that the print job is canceled.

5. A terminal device, comprising: an application software module, a print data processing module, a print control module, and a background print processing module, wherein:
    the application software module is configured to transmit original print job content of a print job to the print data processing module;
    the print data processing module is configured to perform language conversion on the original print job content to generate print job content recognizable by an image forming apparatus and transmit the print job content to the background print processing module;
    the background print processing module is configured to determine whether the print job is canceled, and in response to that the print job is determined to be canceled, transmit the print job content before the print job is cancelled to the print control module; and
    the print control module is configured to add specific data in the print job content before the print job is cancelled to generate print data and transmit the print data to the image forming apparatus, wherein the image forming apparatus completes reception of all print data of the print job and ends the print job according to the specific data analyzed from the print data, after analyzing the print job end mark; and the specific data is configured to instruct an end of the print job and includes a print job mark.

6. The terminal device according to claim 5, wherein the specific data includes dummy data, and when the dummy data is analyzed, the image forming apparatus exits an analyzing operation.

7. The terminal device according to claim 5, wherein:
    the background print processing module is further configured to, in response to that the print job is determined to be canceled, transmit a transmission termination notification to the print data processing module; and
    the print data processing module is further configured to, according to the transmission termination notification, terminate transmission of the print job content transmitted by the application software module.

8. A terminal device, comprising: a memory, storing a computer program for performing a print job cancellation method; and a processor, coupled with the memory and when the computer program being executed, configured to:
    determine whether a print job is canceled;
    in response to that the print job is determined to be canceled, add specific data to print job content of the print job to generate print data, wherein the specific data is configured to instruct an end of the print job and includes a print job mark; and
    transmit the print data to an image forming apparatus, such that after analyzing the print job end mark, the image forming apparatus completes reception of all print data of the print job and ends the print job according to the specific data analyzed from the print data.

9. The terminal device according to claim 8, wherein the specific data includes dummy data, and when the dummy data is analyzed, the image forming apparatus exits an analyzing operation.

10. The terminal device according to claim 9, wherein:
    a byte length of the dummy data is configured to be greater than a byte length of a data band scanned by the image forming apparatus from the print data.

11. The terminal device according to claim 8, wherein determining whether the print job is canceled includes:
    in response to that a print cancellation instruction inputted by the user is monitored, determining that the print job is canceled.

12. A non-transitory computer-readable storage medium, wherein the computer-readable storage medium stores a program; and when being executed, the program causes a device where the computer-readable storage medium is located to execute the print job cancellation method according to claim 1.

13. The computer-readable storage medium according to claim 12, wherein the specific data includes dummy data, and when the dummy data is analyzed, the image forming apparatus exits an analyzing operation.

14. The computer-readable storage medium according to claim 13, wherein:
    a byte length of the dummy data is configured to be greater than a byte length of a data band scanned by the image forming apparatus from the print data.

15. The computer-readable storage medium according to claim 12, wherein determining whether the print job is canceled includes:
    in response to that a print cancellation instruction inputted by the user is monitored, determining that the print job is canceled.

16. A non-transitory computer program product, comprising an instruction, wherein when being executed on a computer or any at least one processor, the computer program product causes the computer to execute the print job cancellation method according to claim 1.

17. The non-transitory computer program product according to claim 16, wherein: the specific data includes dummy data, and when the dummy data is analyzed, the image forming apparatus exits an analyzing operation.

18. The non-transitory computer program product according to claim 17, wherein:
- a byte length of the dummy data is configured to be greater than a byte length of a data band scanned by the image forming apparatus from the print data.

19. The non-transitory computer program product according to claim 16, wherein determining whether the print job is canceled includes:
- in response to that a print cancellation instruction inputted by the user is monitored, determining that the print job is canceled.

* * * * *